(12) United States Patent
Doh et al.

(10) Patent No.: US 11,516,448 B2
(45) Date of Patent: Nov. 29, 2022

(54) METHOD AND APPARATUS FOR COMPENSATING PROJECTION IMAGES

(71) Applicant: Korea University Research and Business Foundation, Seoul (KR)

(72) Inventors: Nak Ju Doh, Seoul (KR); Hyung A Choi, Anyang-si (KR); Bum Chul Jang, Seoul (KR); Sang Min Ahn, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 488 days.

(21) Appl. No.: 16/672,664

(22) Filed: Nov. 4, 2019

(65) Prior Publication Data
US 2020/0145630 A1 May 7, 2020

(30) Foreign Application Priority Data

Nov. 5, 2018 (KR) .................. 10-2018-0134460
Aug. 28, 2019 (KR) .................. 10-2019-0105908

(51) Int. Cl.
*H04N 9/31* (2006.01)
*G03B 21/13* (2006.01)

(52) U.S. Cl.
CPC ......... *H04N 9/3185* (2013.01); *H04N 9/3129* (2013.01); *G03B 21/13* (2013.01)

(58) Field of Classification Search
CPC ...... H04N 9/31–3197; G06T 15/00–87; G06T 11/00–80
See application file for complete search history.

(56) References Cited

U.S. PATENT DOCUMENTS

2017/0140512 A1* 5/2017 Hemani .................. G06T 19/20

* cited by examiner

*Primary Examiner* — Christopher A Lamb, II
(74) *Attorney, Agent, or Firm* — NSIP Law (57) ABSTRACT

The projection image compensating method according to an embodiment of the present disclosure includes acquiring mesh data, at least one representative image, at least one supplementary image, and position information which is information about an obtaining pose of each image for an indoor space; adding an index of each of the plurality of faces to a matrix corresponding to a size of the at least one representative image in accordance with a result of projecting the plurality of faces which configures the mesh data to the at least one representative image; detecting at least one occluded face among the plurality of faces, using an index added to the matrix; and extracting pixel information which is information of a pixel value corresponding to the at least one occluded face from the at least one supplementary image.

14 Claims, 10 Drawing Sheets

[FIG. 1]

Image 1        Image 2

METHOD AND APPARATUS FOR COMPENSATING PROJECTION IMAGES

CROSS-REFERENCE TO RELATED APPLICATIONS

This application claims the priority of Korean Patent Application No. 10-2018-0134460 filed on Nov. 5, 2018 and No. 10-2019-0105908 filed on Aug. 28, 2019, in the Korean Intellectual Property Office, the disclosure of which is incorporated herein by reference.

BACKGROUND

Field

The present disclosure relates to a projection image compensating method and apparatus, and more particularly to a method and an apparatus for compensating problems generated in a projection image generated using an image and mesh data for an indoor space.

Description of the Related Art

A projection image which is information generated based on a mesh and an image acquired for an indoor space represents a three-dimensional image seen from a field of view of a user which is in an arbitrary position or a two-dimensional image which can be acquired by projecting the three-dimensional image.

An existing service which provides a three-dimensional image for indoor/outdoor environments may generally provide only a result in an image acquiring position. That is, a single image provides only information for an area seen from a field of view of a camera in the corresponding acquiring position. Therefore, when it is seen in a position and an angle other than the image acquiring position, there may be an area where RGB information is not defined so that a user may feel awkwardness. Therefore, services which are being currently provided limit a position and a field of view of the user.

With regard to this, in order to overcome the limitation of the existing services by performing texture mapping on a mesh area seen in an arbitrary position and a field of view using a plurality of images, there may be problems such as an discontinuous section in the image, an area blocked from the field of view, and an illumination difference between images.

Figure 1:
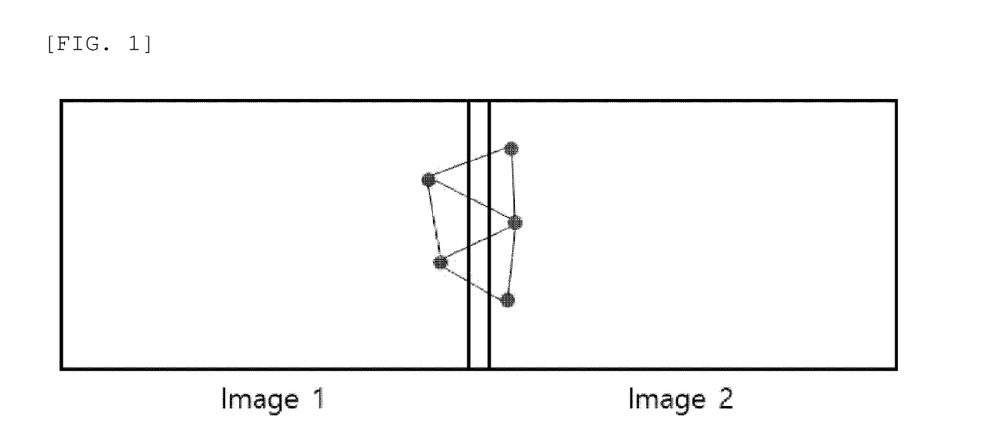
FIGS. 1 and 2 are exemplary views illustrating a discontinuous face generated when a projection image is generated.

The discontinuous section in the image means that when vertexes which form a face configuring a mesh as illustrated in FIG. 1 are projected on an image, the projected points are not connected to each other in the image. Generally, when the texture mapping is performed using images, an RGB value is defined using pixel values in an area formed by projected points after projecting vertexes which configure a mesh face onto an image. However, in a large indoor space, a plurality of images is obtained while moving the position. In the case of a face around a boundary of an area covered by the images, vertexes which form the face may be projected onto different images. As a result, when all the projected points do not exist in one image, the RGB value of the face may not be defined. That is, information of the RGB value may exist separately in different images, but the information is not used, and information loss may be caused.

Since the existing texture mapping technique mainly uses a virtual model, the problem may be solved by adjusting the position of the vertex such that there is no face divided by a boundary of an image. However, when a mesh and a plurality of images obtained in an actual environment are used, it is actually difficult to adjust the vertex in consideration of all the image acquiring positions.

When a normal front image is used, there may be a plurality of faces in which the RGB information is not defined at every image boundary. In order to prevent the problem, an image may be acquired to have a larger area which overlaps the previous image. However, in this case, the relationship with the previous image needs to be considered at all times so that it is very troublesome to acquire the data and redundant data is increased.

Figure 2:
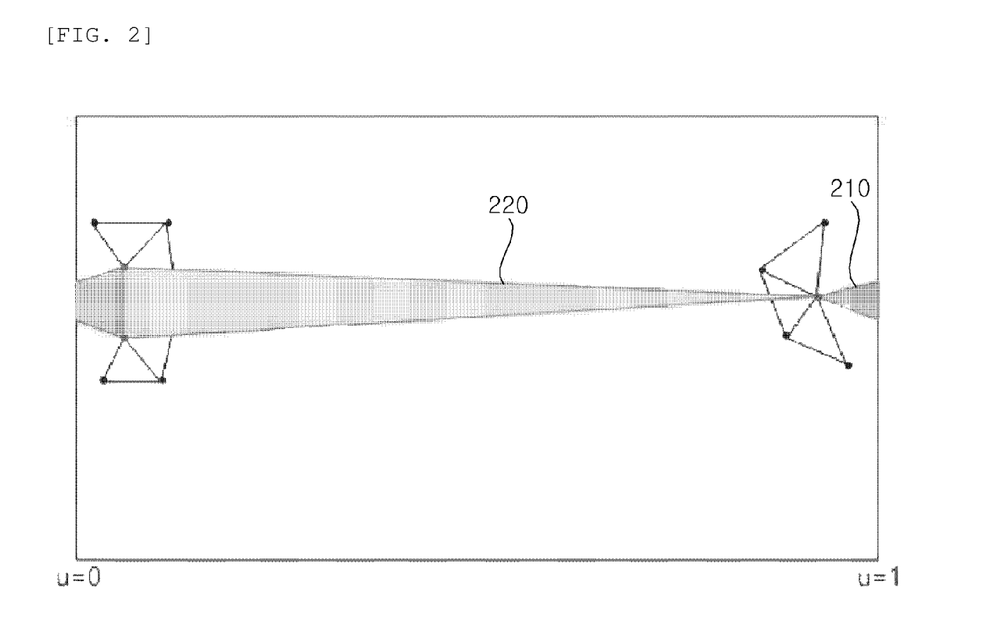
Figure 3:
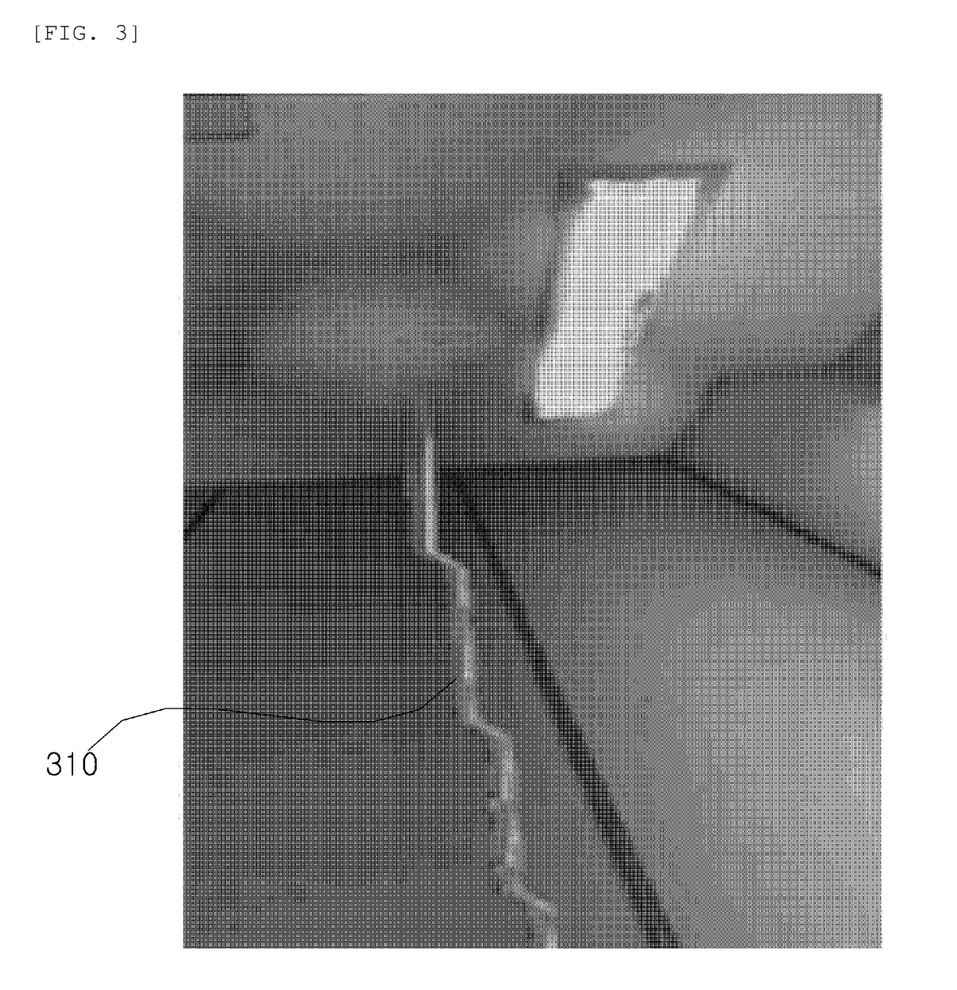
FIG. 3 is an exemplary view illustrating an abnormal seam generated when a projection image is generated.

In order to compensate this problem, a panorama image which represents all 360 degrees may be used instead of the front image. However, even though the panorama image is used, there is another type of image discontinuous section where vertexes forming a face as illustrated in FIG. 2 are projected to be divided at left and right ends of the image. In this case, an area which needs to match the face is also two areas divided by left and right boundaries of the image. For example, when three vertexes configure one face, as represented by red areas 210 of FIG. 2, areas divided into a rectangle and a triangle with respect to the left and right boundaries of the image are areas to match the face. However, as the texturing is performed based on a pixel in a triangle which traverses the image as represented by a blue area 220 of FIG. 2, rather than the divided areas located at left and right ends of the image, the face may have wrong RGB information. In this case, faces which are incorrectly textured are gathered to generate an abnormal seam 310 which is distinguished from surrounding pixels as illustrated in FIG. 3.

Further, an area (occlusion) which is blocked from the field of view refers to an area which is blocked by a wall or an obstacle not to be seen from the field of view of the user. The image and the mesh form a mapping relationship by a simple projecting method using a projection matrix. In this case, there may be a problem in that an image of the front area may be repeatedly textured in the occlusion. That is, the wrong RGB information is input to affect correct RGB information by another image or an RGB value is defined in a portion where the RGB information is not necessary. Therefore, the user may feel awkwardness. In the meantime, the easiest method to find the occlusion is to identify whether a ray which is irradiated toward the vertex in the image acquiring position by ray casting passes another face. However, when it is identified whether every vertex meets all the faces, the consumed time is sharply increased in accordance with the number of vertexes and faces so that there may be a limit in actual usage.

Therefore, a necessity for a method and an apparatus for compensating a projection image which provide an excellent quality of projection image in an arbitrary position and field of view while solving the above-described problem comes to the fore.

SUMMARY

An object of the present disclosure is to provide a method and an apparatus for providing a projection image having an excellent quality in an arbitrary position and field of view by compensating problems of a discontinuous section and an occlusion generated in a projection image generated using a plurality of images and mesh data.

Technical problems of the present disclosure are not limited to the above-mentioned technical problem(s), and other technical problem(s), which is (are) not mentioned above, can be clearly understood by those skilled in the art from the following descriptions.

According to an aspect of the present disclosure, a projection image compensating method includes acquiring mesh data, at least one representative image, at least one supplementary image, and position information which is information about an obtaining pose of each image for an indoor space; adding an index of each of the plurality of faces to a matrix corresponding to a size of the at least one representative image in accordance with a result of projecting the plurality of faces which configures the mesh data to the at least one representative image; detecting at least one occluded face where another face is located between an obtaining pose included in the position information of the at least one representative image and vertexes included in the plurality of faces, among the plurality of faces, using the index added to the matrix; and extracting pixel information which is information of a pixel value corresponding to the at least one occluded face from the at least one supplementary image.

Desirably, the adding of an index of each of the plurality of faces, may project each of the plurality of faces onto the at least one representative image and add an index of the corresponding face to an area corresponding to a minimum rectangle including each of the projected area in the matrix.

Desirably, the detecting of at least occluded discontinuous face may include projecting vertexes included in the plurality of faces to the at least one representative image; acquiring a plurality of indexes corresponding to a pixel located within a predetermined distance from the pixel onto which the vertexes are projected in the matrix; and detecting the at least one occluded face depending on whether the face corresponding to the plurality of indexes is located between the obtaining pose and the vertexes included in the plurality of faces.

According to another aspect of the present disclosure, a projection image compensating apparatus includes an acquiring unit which acquires mesh data, at least one representative image, at least one supplementary image, and position information which is information about an obtaining pose of each image for an indoor space; a matrix generating unit which adds an index of each of the plurality of faces to a matrix corresponding to a size of the at least one representative image in accordance with a result of projecting the plurality of faces which configures the mesh data to the at least one representative image; a detecting unit which detects at least one occluded face where another face is located between an obtaining pose included in the position information of the at least one representative image and vertexes included in the plurality of faces, among the plurality of faces, using an index added to the matrix; and an extracting unit which extracts pixel information which is information of a pixel value corresponding to the at least one occluded face from the at least one supplementary image.

Desirably, the matrix generating unit may project each of the plurality of faces onto the at least one representative image and add an index of the corresponding face to an area corresponding to a minimum rectangle including each of the projected area in the matrix.

Desirably, the detecting unit may project vertexes included in the plurality of faces to the at least one representative image, acquire a plurality of indexes corresponding to a pixel located within a predetermined distance from the pixel onto which the vertexes are projected in the matrix, and detect the at least one occluded face depending on whether the face corresponding to each of the plurality of indexes is located between the obtaining pose and the vertexes included in the plurality of faces.

According to another aspect of the present disclosure, a projection image compensating method includes acquiring mesh data, at least one representative image, at least one supplementary image, and position information which is information about an obtaining pose of each image for an indoor space; detecting at least one discontinuous face which does not have a pixel value corresponding to the at least one representative image in accordance with a predetermined reference, among a plurality of faces which configures the mesh data; and extracting pixel information which is information of a pixel value corresponding to the at least one discontinuous face from the at least one supplementary image.

Desirably, before the detecting of at least one discontinuous face, the projection image compensating method may further include generating updated mesh data obtained by updating the mesh data based on a result of intersecting at least one representative image and a plurality of faces which configures the mesh data and the detecting of at least one discontinuous face may detect at least one discontinuous face from a plurality of faces which configures the updated mesh data.

Desirably, the generating of updated mesh data may include converting a coordinate of the mesh data using the position information corresponding to the at least one representative image; adding an additional vertex in a position where a boundary of the at least one representative image and a plurality of faces which configures the coordinate-converted mesh data intersect; and generating the updated mesh data by dividing the plurality of faces using the additional vertex.

Desirably, the generating of updated mesh data may generate the updated mesh data by sequentially updating the mesh data for the at least one representative image.

Desirably, the detecting of at least one discontinuous face may include identifying a pixel value of the representative image corresponding to each of the vertexes which configure each of the plurality of faces which configures the mesh data; and detecting the at least one discontinuous face with a face having one or more vertexes which does not have a corresponding pixel value in the representative image or a face corresponding to two or more areas including the boundary of a representative image.

According to another aspect of the present disclosure, a projection image compensating apparatus includes an acquiring unit which acquires mesh data, at least one representative image, at least one supplementary image, and position information which is information about an obtaining pose of each image for an indoor space; a detecting unit which detects at least one discontinuous face which does not have a pixel value corresponding to the at least one representative image in accordance with a predetermined reference, among a plurality of faces which configures the mesh data; and an extracting unit which extracts pixel information which is information of a pixel value corresponding to the at least one discontinuous face from the at least one supplementary image.

Desirably, the projection image compensating apparatus may further include a mesh updating unit which generates updated mesh data obtained by updating the mesh data based on a result of intersecting the at least one representative image and a plurality of faces which configures the mesh data and the detecting unit may detect at least one discontinuous face from a plurality of faces which configures the updated mesh data.

Desirably, the mesh updating unit may convert the coordinate of the mesh data using position information corresponding to the at least one representative image, add an additional vertex in a position where the boundary of the at least one representative image and the plurality of faces which configures the coordinate-converted mesh data, and divide the plurality of faces using the additional vertex to generate the updated mesh data.

Desirably, the mesh updating unit may generate the updated mesh data by sequentially updating the mesh data for the at least one representative image.

Desirably, the detecting unit may identify a pixel value of the representative image corresponding to each of the vertexes which configure each of the plurality of faces which configures the updated mesh data and detect the at least one discontinuous face with a face having one or more vertexes which does not have a corresponding pixel value in the representative image or a face corresponding to two or more areas including the boundary of a representative image.

According to the present disclosure, a representative image and a supplementary image are used together so that all RGB information for an area in an arbitrary position and a field of view is defined to generate a three-dimensional image.

Further, according to the present disclosure, when a plurality of representative images is used, it is identified and minimized that a face is projected onto a boundary of the representative images so that RGB values of the projection image are wrongly set, thereby improving a quality of the projection image.

Further, according to the present disclosure, an area (occlusion) blocked from the field of view of the user is distinguished and processed using a supplementary image so that the texture mapping is performed more realistically and the process of distinguishing the occlusion is processed with a less computational amount. Therefore, larger spaces can be more quickly processed.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Those skilled in the art may make various modifications to the present invention and the present invention may have various embodiments thereof, and thus specific embodiments will be illustrated in the drawings and described in detail in detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terms such as first, second, A, or B may be used to describe various components, but the components are not limited by the above terms. The above terms are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment but are not intended to limit the present invention. A singular form may include a plural form if there is no clearly opposite meaning in the context. In the present disclosure, it should be understood that terminology "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of related art and shall not be construed in ideal or excessively formal meanings unless they are clearly defined in the present application.

Hereinafter, exemplary embodiments according to the present disclosure will be described in detail with reference to accompanying drawings.

A projection image compensating apparatus according to an embodiment of the present disclosure receives necessary data from a wheeled mobile robot attached with a sensor system including a camera, an inertial sensor, a Lidar sensor through wired or wireless communication. Alternatively, the projection image compensating apparatus according to an embodiment of the present disclosure is directly mounted in a wheeled mobile robot attached with a sensor system to compensate a projection image. Alternatively, the projection image compensating apparatus according to an embodiment of the present disclosure may be mounted in a backpack type system, a small scanner, or a smart phone including a camera and an inertial sensor or a system attached with a smart phone expanding device to compensate the projection image.

However, the projection image compensating apparatus according to the embodiment of the present disclosure is not limited to the above-described example and may also receive necessary data from a device including various types of sensor systems or may be mounted in various types of devices to compensate the projection image.

Figure 4:
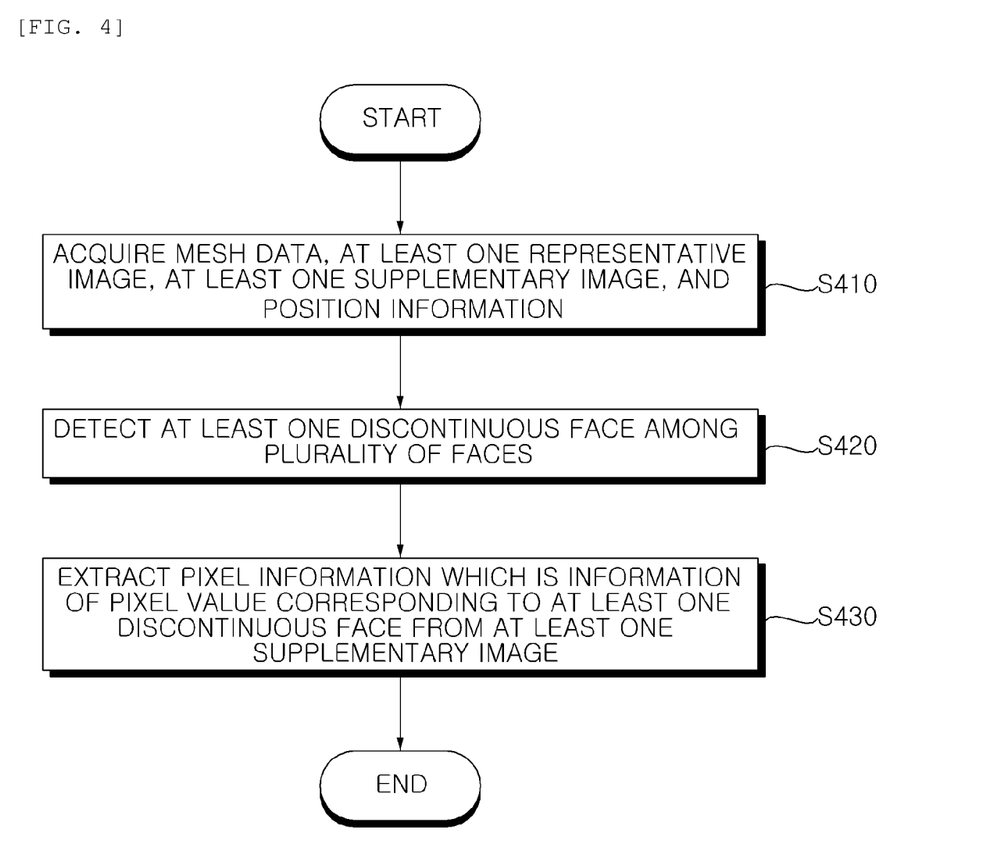
FIG. 4 is a flowchart illustrating a projection image compensating method according to an embodiment of the present disclosure.

FIG. 4 is a flowchart illustrating a projection image compensating method according to an embodiment of the present disclosure.

In step S410, a projection image compensating apparatus acquires mesh data, at least one representative image, at least one supplementary image, and position information which is information about an obtaining pose of each image for an indoor space.

For example, the projection image compensating apparatus may acquire the mesh data, at least one representative image, at least one supplementary image, and the position information from a wheeled mobile robot attached with the sensor system described above. That is, the projection image compensating apparatus may acquire data from the wheeled mobile robot through wired or wireless communication or may be directly mounted in the wheeled mobile robot to acquire the data.

In this case, the position information may include information about an obtaining pose for at least one representative image and at least one supplementary image. The obtaining pose may include information about a 2D or 3D coordinate, a direction of the camera, and a viewing angle when the image is acquired.

In the meantime, the mesh data is data which represents an indoor space with a plurality of faces configured by three or four vertexes and a coordinate value in accordance with a reference coordinate system of the indoor space may be assigned to each vertex. In this case, when a coordinate system of vertexes included in the mesh data is different from a coordinate system for the obtaining pose, the projection image compensating apparatus may convert the coordinate of the vertexes included in the mesh data with respect to the coordinate system for the obtaining pose.

In step S420, the projection image compensating apparatus detects at least one discontinuous face in which there is no pixel value corresponding to at least one representative image in accordance with a predetermined reference, among a plurality of faces which configures the mesh data.

For example, the projection image compensating apparatus detects that there is no pixel value corresponding to at least one representative image, with respect to a face in which some vertexes exist at the outside of a boundary of the representative image or a face corresponding to two or more areas including the boundary of a representative image.

This is because it is difficult for the projection image compensating apparatus to set a specific RGB value for the face. To be more specific, in the case of a face in which some vertexes exist at the outside of the boundary of the representative image, the RGB value for the area at the outside of the boundary may not be defined. Further, in the case of the face corresponding to two or more areas including the boundary of the representative image, an RGB value of another single area may be corresponded.

According to another embodiment, the projection image compensating apparatus may detect at least one discontinuous face for each of the plurality of faces which configures the mesh data.

That is, the projection image compensating apparatus may identify the pixel value of the representative image corresponding to each of vertexes which configure each of the plurality of faces which configures the mesh data. Thereafter, the projection image compensating apparatus may detect at least one discontinuous face with a face having one or more vertexes in which there is no corresponding pixel value in the representative image or a face corresponding to two or more areas including the boundary of a representative image.

For example, when some or all of the vertexes of any face exist at the outside of the boundary of at least one representative image, there is no pixel value corresponding to the some or all of the vertexes so that the projection image compensating apparatus may detect the face as the discontinuous face. Further, when all of the vertexes of any face correspond to two or more areas including the boundary of a representative image, the projection image compensating apparatus may detect the face as the discontinuous face.

Finally, in step S430, the projection image compensating apparatus may extract pixel information which is information of a pixel value corresponding to at least one discontinuous face, from at least one supplementary image.

For example, the projection image compensating apparatus may allow at least one supplementary image and at least one discontinuous face to intersect each other by projecting the supplementary image and the discontinuous face onto a sphere having a predetermined radius. When at least one discontinuous face is included in any one of at least one supplementary image, the projection image compensating apparatus may extract pixel information corresponding to the discontinuous face from the one supplementary image.

Moreover, the projection image compensating apparatus compensates at least one discontinuous face using the pixel information to improve the quality of the projection image.

As described above, according to the present disclosure, when at least one representative image is used, the projection image compensating method identifies and minimizes that a face is projected onto a boundary of the representative images so that RGB values of the projection image are wrongly set, thereby improving a quality of the projection image.

Figure 5:
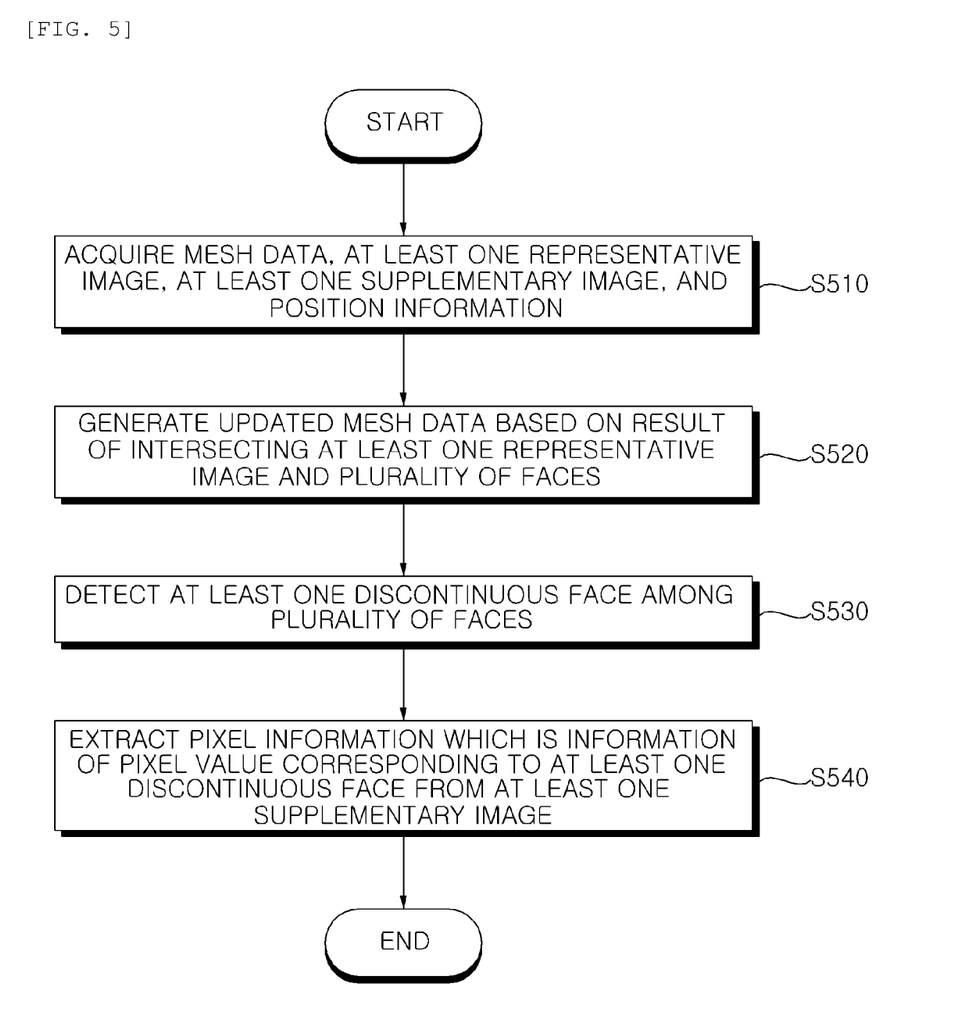
FIG. 5 is a flowchart illustrating a projection image compensating method according to another embodiment of the present disclosure.

FIG. 5 is a flowchart illustrating a projection image compensating method according to another embodiment of the present disclosure.

In step S510, a projection image compensating apparatus acquires mesh data, at least one representative image, at least one supplementary image, and position information which is information about an obtaining pose of each image for an indoor space.

In step S520, the projection image compensating apparatus generates updated mesh data obtained by updating the mesh data based on a result of intersecting at least one representative image and the plurality of faces which configures the mesh data.

For example, the projection image compensating apparatus may allow at least one representative image and mesh data to intersect each other by projecting the representative image and the mesh data onto a sphere having a predetermined radius. The projection image compensating apparatus acquires information about an intersection point extending the boundary from a face extending the boundary of at least one representative image, among a plurality of faces included in the mesh data, and then generates updated mesh data by dividing the corresponding face using the intersection point.

In the meantime, the method for generating updated mesh data will be described in more detail with reference to FIG. 6.

According to another embodiment, the projection image compensating apparatus sequentially updates the mesh data for at least one representative image to generate updated mesh data.

That is, the projection image compensating apparatus may individually update the updated mesh data for at least one representative image to accumulate the updated result. For example, when five representative images are provided, the projection image compensating apparatus may repeatedly update the mesh data five times in total.

In this case, the reason that the projection image compensating apparatus accumulates the updated result is to reflect vertexes and a face which are previously added to a subsequent updating process. That is, when the face was divided for the previous representative image, the vertexes and faces which are newly added were not considered, so that as the same updating process is repeated from the first representative image after updating the mesh data for the last representative image, the size of the discontinuous face may be reduced.

In step S530, the projection image compensating apparatus detects at least one discontinuous face which does not have a pixel value corresponding to at least one representative image in accordance with a predetermined reference, among a plurality of faces which configures the updated mesh data.

Finally, in step S540, the projection image compensating apparatus extracts pixel information which is information of a pixel value corresponding to at least one discontinuous face, from at least one supplementary image.

Figure 6:
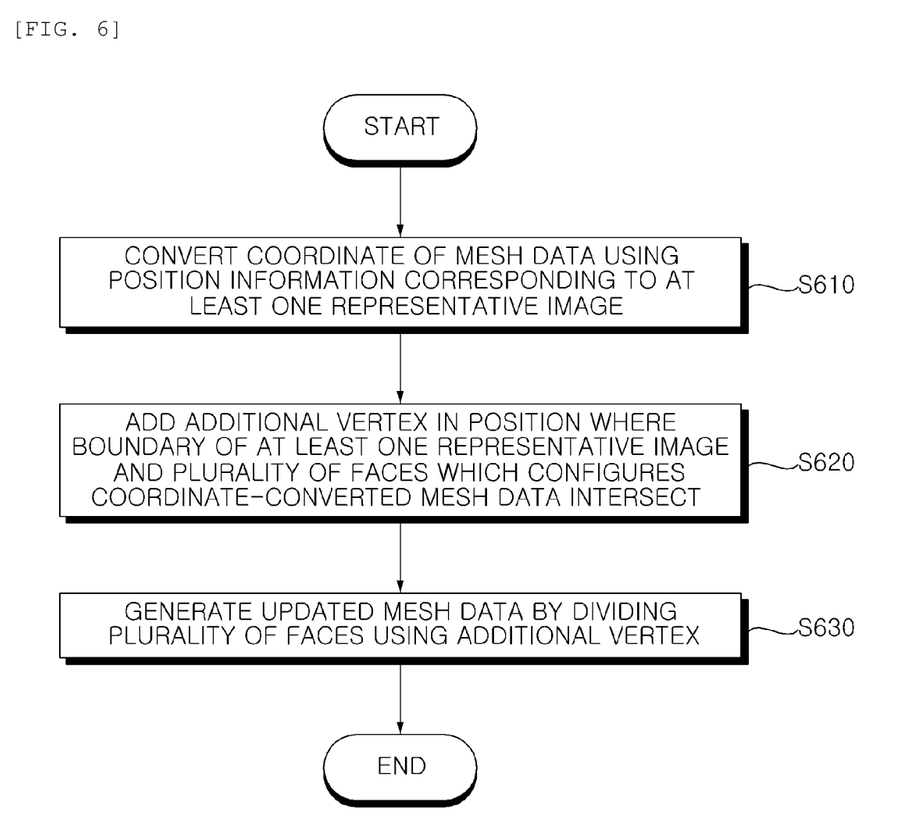
FIG. 6 is a flowchart illustrating an updated mesh data generating method according to an embodiment of the present disclosure.

FIG. 6 is a flowchart illustrating an updated mesh data generating method according to an embodiment of the present disclosure.

In step S610, the projection image compensating apparatus converts a coordinate of the mesh data using position information corresponding to at least one representative image.

That is, in order to intersect the mesh data and the representative image, the projection image compensating apparatus may convert the coordinate of the mesh data with respect to the obtaining pose included in the position information of the representative image.

The projection image compensating apparatus may allow at least one representative image and coordinate-converted mesh data to intersect by projecting the representative image and the coordinate-converted mesh data onto a sphere having a predetermined radius.

In step S620, the projection image compensating apparatus adds an additional vertex in a position where the boundary of at least one representative image intersects a plurality of faces which configures the coordinate-converted mesh data.

In this case, the projection compensating apparatus detects and adds an additional vertex in a position where the face and the boundary of the representative image intersect.

Figure 11:
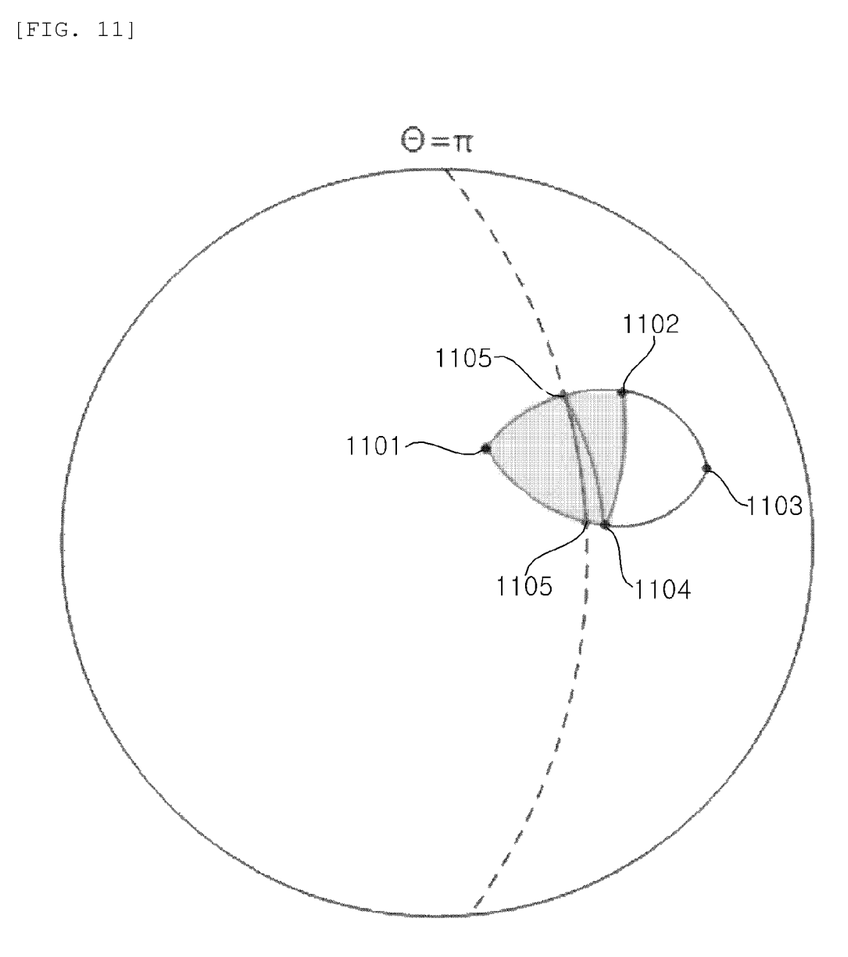
FIG. 11 is a diagram for describing a face dividing process according to an embodiment of the present disclosure.

For example, referring to FIG. 11, the projection image compensating apparatus may detect and add two additional vertexes 1105 and 1106 in a position where a face configured by three vertexes 1101, 1102, and 1104 and a boundary of the representative image intersect.

Finally, in step S630, the projection image compensating apparatus generates the updated mesh data by dividing the plurality of faces using the additional vertexes.

For example, referring to FIG. 11, the projection image compensating apparatus divides one face (1101, 1102, 1104) into three faces using two additional vertexes 1105 and 1106 to generate the updated mesh data. In this case, three faces may be configured by vertexes (1101, 1105, 1106), (1104, 1105, 1106), and (1102, 1104, 1105), respectively.

Figure 7:
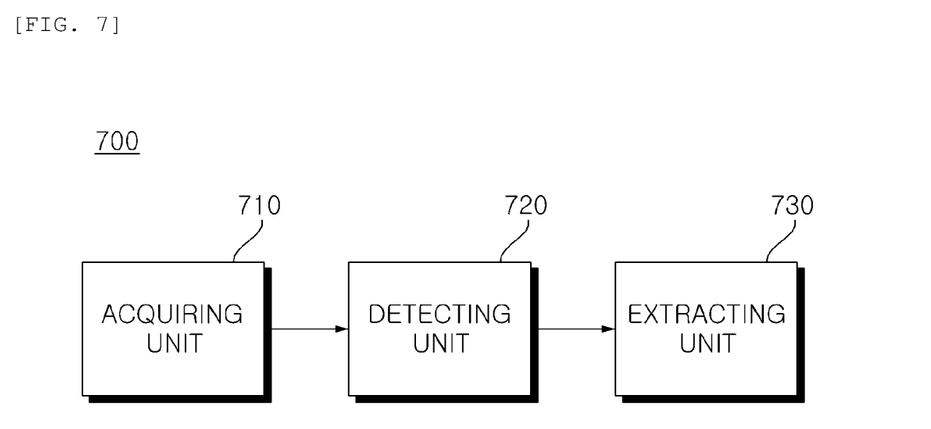
FIG. 7 is a block diagram illustrating a projection image compensating apparatus according to an embodiment of the present disclosure.

FIG. 7 is a block diagram illustrating a projection image compensating apparatus according to an embodiment of the present disclosure.

Referring to FIG. 7, a projection image compensating apparatus 700 according to an embodiment of the present disclosure includes an acquiring unit 710, a detecting unit 720, and an extracting unit 730. Further, the projection image compensating apparatus 700 may include a mesh updating unit (not illustrated) as an option.

The acquiring unit 710 acquires mesh data, at least one representative image, at least one supplementary image, and position information which is information about an obtaining pose of each image for an indoor space.

The mesh updating unit (not illustrated) generates updated mesh data obtained by updating the mesh data, based on a result of intersecting at least one representative image and a plurality of faces which configures the mesh data.

According to another embodiment, the mesh updating unit (not illustrated) converts the coordinate of the mesh data using position information corresponding to at least one representative image, adds an additional vertex in a position where the boundary of at least one representative image intersects the plurality of faces which configures the coordinate-converted mesh data, and divides the plurality of faces using the additional vertex to generate updated mesh data.

According to another embodiment, the mesh updating unit (not illustrated) sequentially updates the mesh data for at least one representative image to generate updated mesh data.

The detecting unit 720 detects at least one discontinuous face which does not have a pixel value corresponding to at least one representative image in accordance with a predetermined reference, among a plurality of faces which configures the mesh data or the updated mesh data.

According to another embodiment, the detecting unit 720 identifies a pixel value of the representative image corresponding to each of the vertexes which configure each of the plurality of faces which configures the mesh data and detects at least one discontinuous face with a face having one or more vertexes which does not have a corresponding pixel value in the representative image or a face corresponding to two or more areas including the boundary of a representative image.

The extracting unit 730 extracts pixel information which is information of a pixel value corresponding to at least one discontinuous face from at least one supplementary image.

Figure 8:
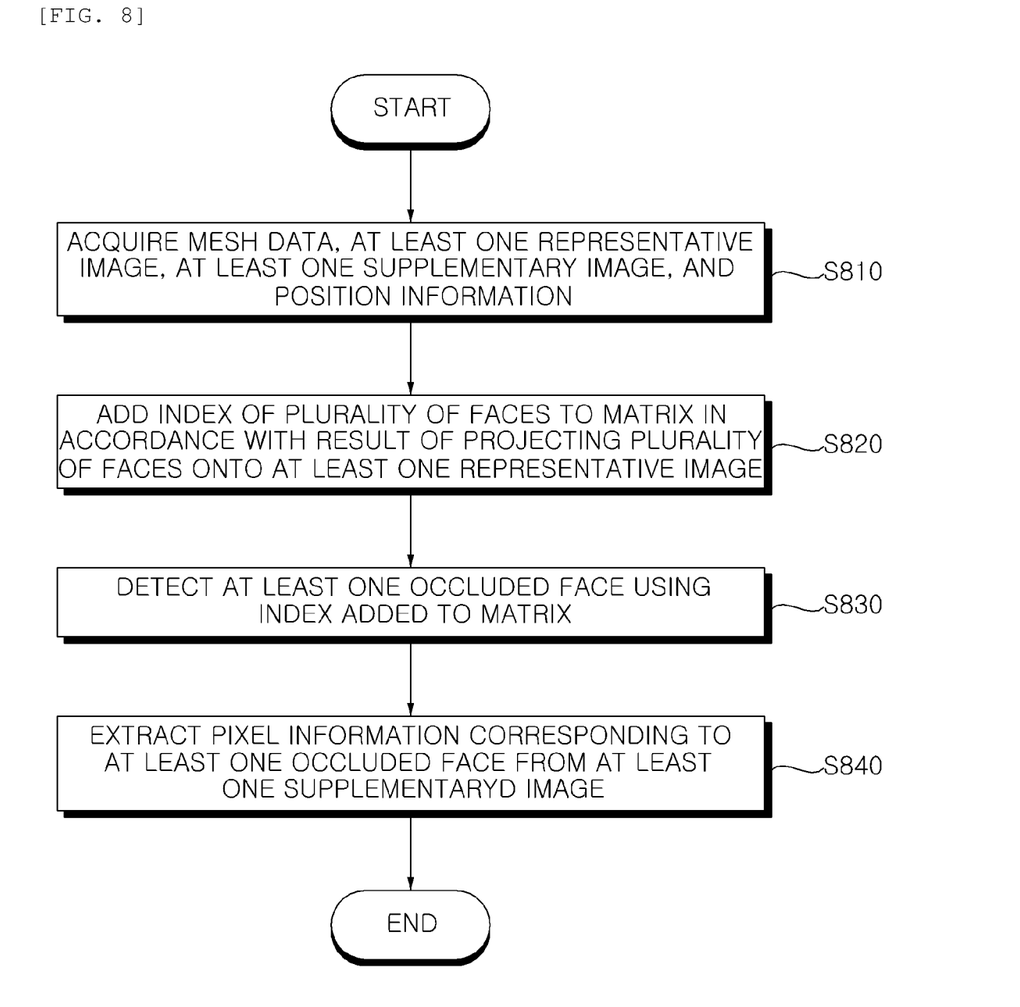
FIG. 8 is a flowchart illustrating a projection image compensating method according to another embodiment of the present disclosure.

FIG. 8 is a flowchart illustrating a projection image compensating method according to another embodiment of the present disclosure.

In step S810, a projection image compensating apparatus acquires mesh data, at least one representative image, at least one supplementary image, and position information which is information about an obtaining pose of each image for an indoor space.

In step S820, the projection image compensating apparatus adds an index of each of the plurality of faces to a matrix corresponding to a size of at least one representative image in accordance with a result of projecting the plurality of faces which configures the mesh data onto at least one representative image.

In this case, a row and a column of the matrix may be determined by the number of pixels in a horizontal direction and the number of pixels in a vertical direction of the representative image, respectively. For example, the row and the column of the matrix may be set to be equal to the number of pixels in a horizontal direction and the number of pixels in a vertical direction of the representative image, respectively. Further, in order to shorten a processing time to compensate the projection image, the row and the column of the matrix may be set to be smaller than the number of pixels in the horizontal direction and the number of pixels in the vertical direction of the representative image, respectively.

Thereafter, the projection image compensating apparatus may sequentially project the plurality of faces to each of the representative images. The projection image compensating apparatus may add an index of the face to the area of the matrix corresponding to a pixel onto which the face is projected, among pixels of the representative image.

Figure 14:
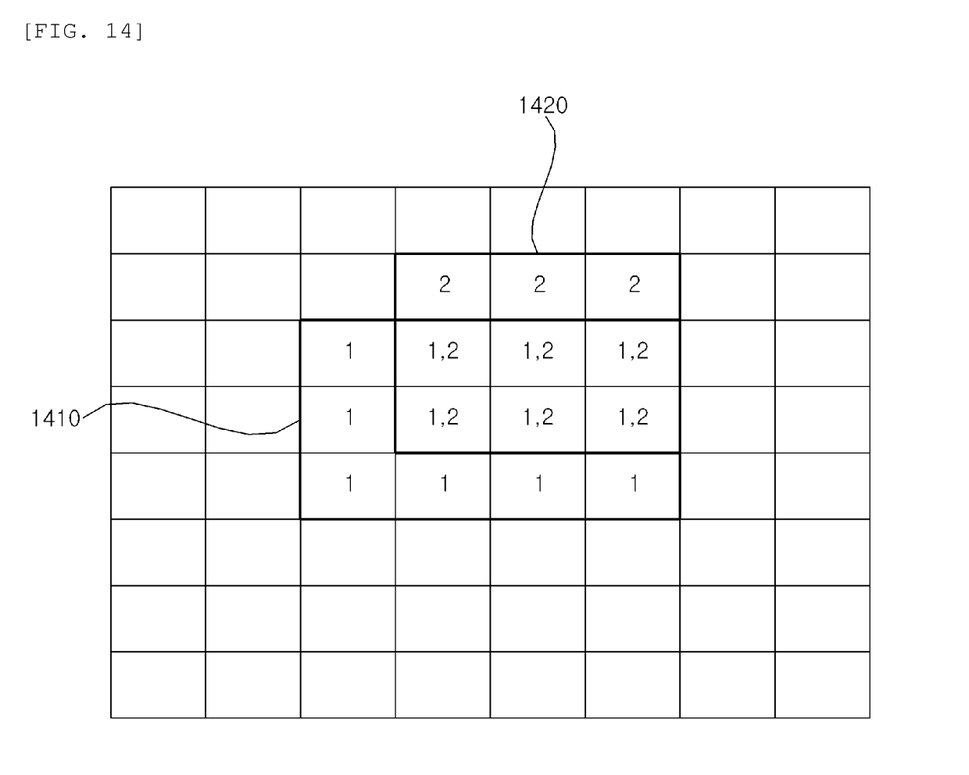
FIG. 14 is a diagram illustrating a matrix including a face index according to an embodiment of the present disclosure.

For example, referring to FIG. 14, the projection image compensating apparatus may add indexes 1 and 2 to areas 1410 and 1420 of the matrix.

According to another embodiment, the projection image compensating apparatus projects each of the plurality of faces onto at least one representative image and adds an index of the corresponding face to an area corresponding to a minimum rectangle including the projected area in the matrix.

That is, the projection image compensating apparatus obtains a minimum rectangle area including the projected area instead of the area onto which the face is projected to shorten a time required to record the face index of the matrix. This is because the projection image compensating apparatus does not need to individually calculate the pixel onto which the corresponding face is accurately projected in the representative image.

Figure 12:
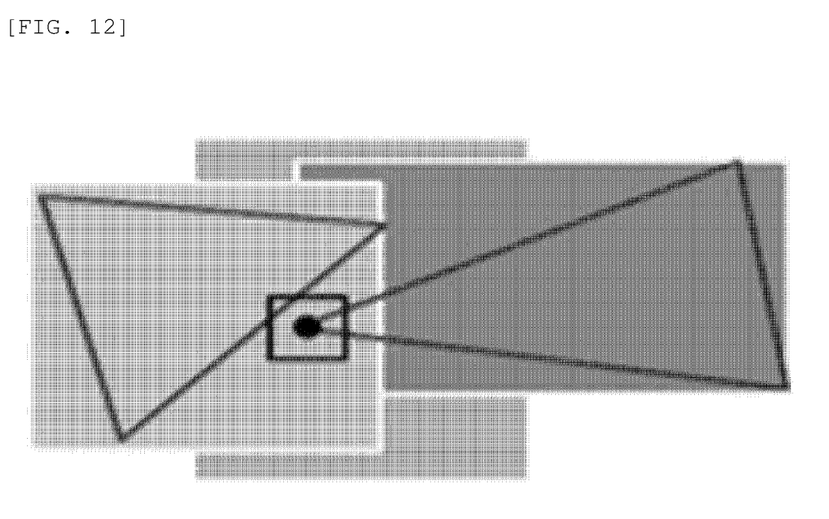
FIG. 12 is a diagram illustrating an index matrix generating process according to an embodiment of the present disclosure.

For example, referring to FIG. 12, the projection image compensating apparatus may add an index of the face to the minimum rectangle area including the face.

In step S830, the projection image compensating apparatus detects at least one occluded face where another face is located between an obtaining pose included in position information of at least one representative image and vertexes included in the plurality of faces, among the plurality of faces, using an index added to the matrix.

That is, the projection image compensating apparatus may detect at least one occluded face using a ray intersection technique.

More specifically, when a segment connecting an obtaining pose of a representative image and vertexes of a first face is drawn, if there is a second face intersecting the segment, the projection image compensating apparatus may detect the first face as an occluded face which is a face blocked from the field of view. In this case, the projection image compensating apparatus may determine whether there is a second face using a face index added to a position corresponding to the vertexes in the matrix.

According to another embodiment, when a segment connecting an obtaining pose of a representative image and vertexes which configures the first face is drawn, the projection image compensating apparatus may detect at least one occluded face in accordance with the number of vertexes having a second face which intersects the segment.

For example, when there is a second face in a part of the vertexes which configure the first face, the projection image compensating apparatus may determine the first face as an occluded face and when the number of vertexes at which there is a second face is one or more, may detect the first face as an occluded face.

Further, when there is a second face in the entire vertexes which configure the face, the projection image compensating apparatus determines it as an occluded face and when the number of vertexes at which there is a second face is smaller than the number of vertexes which configure the face, may not detect it as a discontinuous face.

Finally, in step S840, the projection image compensating apparatus extracts pixel information which is information of a pixel value corresponding to at least one occluded face, from at least one supplementary image.

That is, the projection image compensating apparatus cannot extract the pixel information of the occluded face using at least one representative image due to the limited field of view so that the pixel information may be extracted from at least one supplementary image.

As described above, the projection image compensating method according to another embodiment of the present disclosure distinguishes the occlusion blocked from the field of view of the user and uses the supplementary image to perform the texture mapping more realistically.

Figure 9:
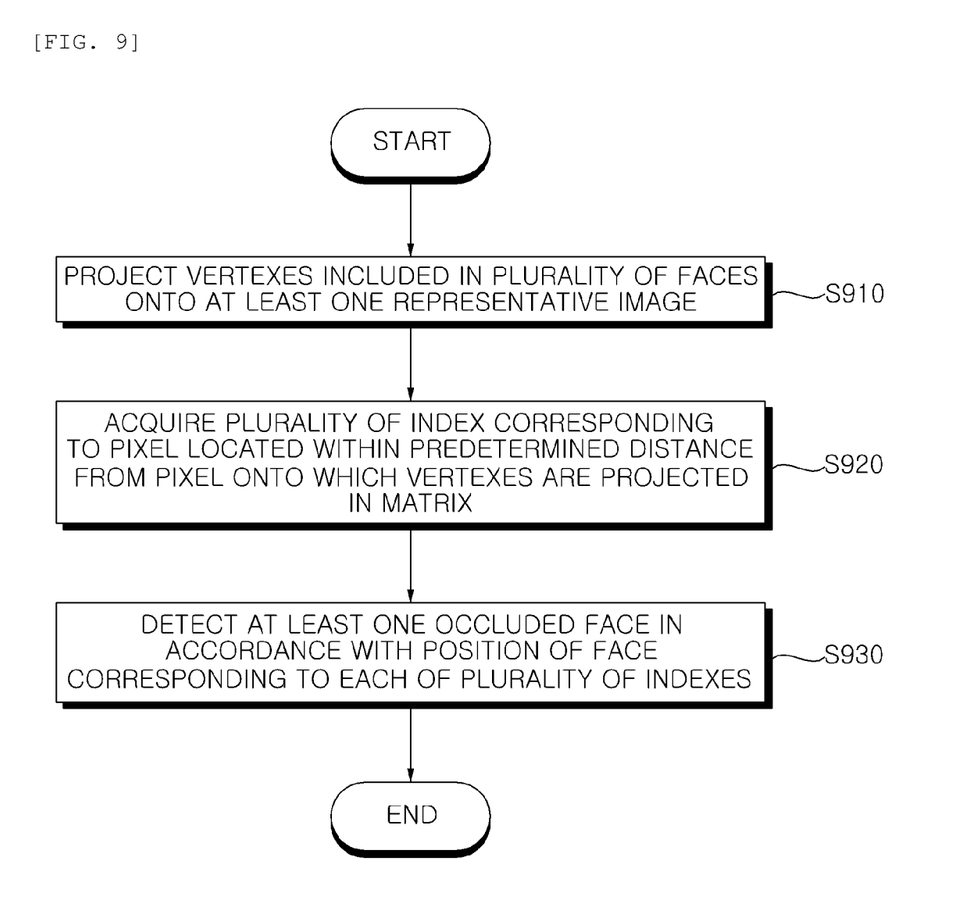
FIG. 9 is a flowchart illustrating an occluded face detecting method according to an embodiment of the present disclosure.

FIG. 9 is a flowchart illustrating an occluded face detecting method according to an embodiment of the present disclosure.

In step S910, the projection image compensating apparatus projects vertexes included in the plurality of faces to at least one representative image.

In this case, the projection image compensating apparatus may first project the vertexes onto at least one representative image to determine whether to be occluded using the matrix.

In step S920, the projection image compensating apparatus acquires a plurality of indexes corresponding to a pixel located within a predetermined distance from a pixel onto which the vertexes are projected in the matrix.

In this case, the projection image compensating apparatus may acquire a plurality of indexes corresponding to a pixel located within a predetermined distance in consideration of a calculation error. In this case, the projection image compensating apparatus limits the detection target only to a face corresponding to the plurality of indexes to shorten a time required to detect the occluded face.

Further, the projection image compensating apparatus may prevent an index of the face including the vertexes from being included in the plurality of indexes. This is because the field of view of the face including the vertexes cannot be blocked from the obtaining pose due to the face including the vertexes.

Finally, in step S930, the projection image compensating apparatus detects at least one occluded face depending on whether the face corresponding to each of the plurality of indexes is located between the obtaining pose and the vertexes included in the plurality of faces.

Figure 13:
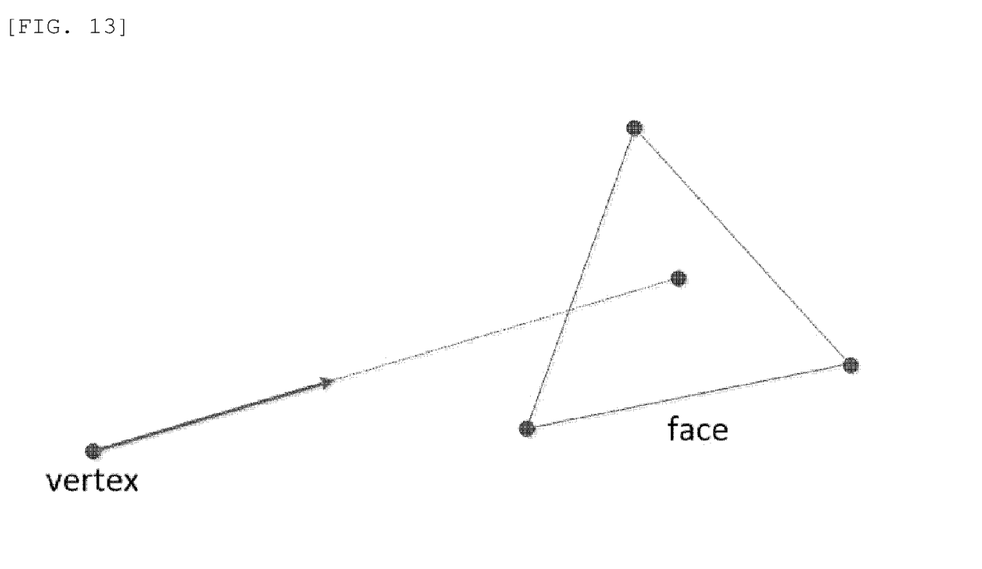
FIG. 13 is a diagram illustrating an occluded face detecting process according to an embodiment of the present disclosure.

For example, referring to FIG. 13, the projection image compensating apparatus may connect a segment from the vertexes to the obtaining pose. When there is a face intersecting the segment among the plurality of faces corresponding to the plurality of indexes, the projection image compensating apparatus may detect the face including the vertexes as an occluded face.

As described above, the occluded face detecting method according to an embodiment of the present disclosure applies a process of distinguishing an occlusion from the obtaining pose to be limited to a field of view of the obtaining pose with a small computational amount so that the occluded face may be quickly detected even in a large space.

Figure 10:
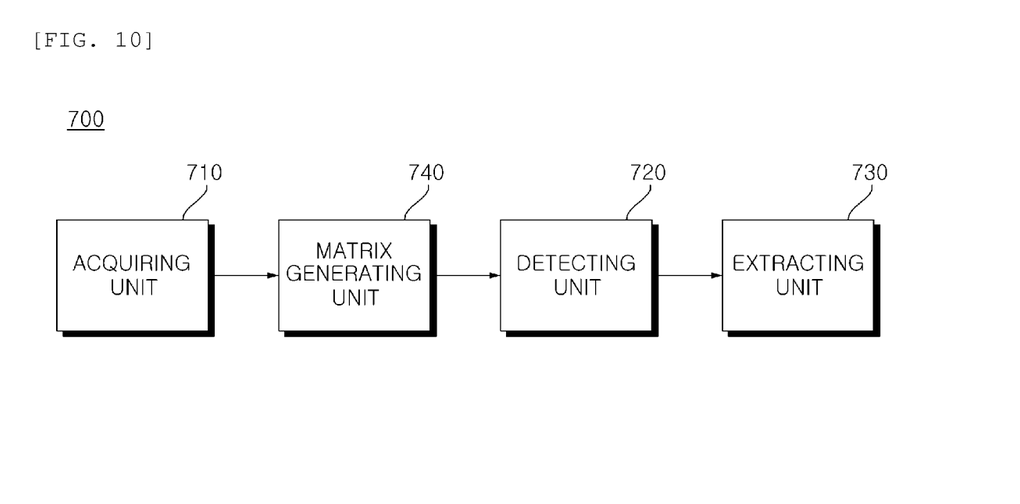
FIG. 10 is a block diagram illustrating a projection image compensating apparatus according to another embodiment of the present disclosure.

FIG. 10 is a block diagram illustrating a projection image compensating apparatus according to another embodiment of the present disclosure.

Referring to FIG. 10, a projection image compensating apparatus 700 according to another embodiment of the present disclosure includes an acquiring unit 710, a matrix generating unit 740, a detecting unit 720, and an extracting unit 730.

The acquiring unit 710 acquires mesh data, at least one representative image, at least one supplementary image, and position information which is information about an obtaining pose of each image for an indoor space.

The matrix generating unit 740 adds an index of each of the plurality of faces to a matrix corresponding to a size of at least one representative image in accordance with a result of projecting the plurality of faces which configures the mesh data to at least one representative image.

According to another embodiment, the matrix generating unit 740 projects each of the plurality of faces onto at least one representative image and adds an index of the corresponding face to an area corresponding to a minimum rectangle including the projected area in the matrix.

The detecting unit 720 detects at least one occluded face where another face is located between an obtaining pose included in position information of at least one representative image and vertexes included in the plurality of faces, among the plurality of faces, using an index added to the matrix.

According to another embodiment, the detecting unit 720 projects the vertexes included in the plurality of faces onto at least one representative image, acquires a plurality of indexes corresponding to pixels located within a predetermined distance from a pixel onto which the vertexes are projected, and detects at least one occluded face depending on whether the face corresponding to each of the plurality of indexes is located between the obtaining pose and the vertexes included in the plurality of faces.

The extracting unit 730 extracts pixel information which is information of a pixel value corresponding to at least one occluded face from at least one supplementary image.

The above-described exemplary embodiments of the present invention may be created by a computer-executable program and implemented in a general use digital computer which operates the program using a computer-readable medium.

The computer-readable recording medium includes a magnetic storage medium (for example, a ROM, a floppy disk, and a hard disk) and an optical reading medium (for example, CD-ROM and a DVD).

For now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

What is claimed is:

1. A projection image compensating method, comprising:
   acquiring mesh data, at least one representative image, at least one supplementary image, and position information which is information about an obtaining pose of each image for an indoor space;
   adding an index of each of the plurality of faces to a matrix corresponding to a size of the at least one representative image in accordance with a result of projecting the plurality of faces which configures the mesh data onto the at least one representative image;
   detecting at least one occluded face where another face is located between an obtaining pose included in the position information of the at least one representative image and vertexes included in the plurality of faces, among the plurality of faces, using an index added to the matrix; and
   extracting pixel information which is information of a pixel value corresponding to the at least one occluded face from the at least one supplementary image.

2. The projection image compensating method according to claim 1, wherein in the adding of an index of each of the plurality of faces, each of the plurality of faces is projected onto the at least one representative image and an index of the corresponding face is added to an area corresponding to a minimum rectangle including the projected area in the matrix.

3. The projection image compensating method according to claim 1, wherein the detecting of at least one occluded face includes:
   projecting the vertexes included in the plurality of faces to the at least one representative image;
   acquiring a plurality of indexes corresponding to a pixel located within a predetermined distance from the pixel onto which the vertexes are projected in the matrix; and
   detecting the at least one occluded face depending on whether the face corresponding to each of the plurality of indexes is located between the obtaining pose and the vertexes included in the plurality of faces.

4. A projection image compensating apparatus, comprising:
   a memory configured to store computer-readable instructions: and
   one or more processors configured to execute the computer-readable instructions such that the one or more processors are configured to:
   acquire mesh data for an indoor space, at least one representative image, at least one supplementary image, and position information which is information about an obtaining pose of each image;
   add an index of each of the plurality of faces to a matrix corresponding to a size of the at least one representative image in accordance with a result of projecting the plurality of faces which configures the mesh data to the at least one representative image;
   detect at least one occluded face where another face is located between an obtaining pose included in the position information of the at least one representative image and vertexes included in the plurality of faces, among the plurality of faces, using an index added to the matrix; and extract pixel information which is information of a pixel value corresponding to the at least one occluded face from the at least one supplementary image.

5. The projection image compensating apparatus according to claim 4, wherein the one or more processors projects each of the plurality of faces onto the at least one representative image and adds an index of the corresponding face to an area corresponding to a minimum rectangle including the projected area in the matrix.

6. The projection image compensating apparatus according to claim 4, wherein the one or more processors projects the vertexes included in the plurality of faces to the at least one representative image, acquires a plurality of indexes corresponding to a pixel located within a predetermined distance from the pixel onto which the vertexes are projected in the matrix, and detects the at least one occluded face depending on whether the face corresponding to each of the plurality of indexes is located between the obtaining pose and the vertexes included in the plurality of faces.

7. A projection image compensating method, comprising:
acquiring mesh data, at least one representative image, at least one supplementary image, and position information which is information about an obtaining pose of each image for an indoor space;
generating updated mesh data obtained by updating the mesh data based on a result of intersecting at least one representative image and a plurality of faces which configures the mesh data before the detecting of at least one discontinuous face;
detecting at least one discontinuous face which does not have a pixel value corresponding to the at least one representative image in accordance with a predetermined reference, among a plurality of faces which configures the mesh data; and
extracting pixel information which is information of a pixel value corresponding to the at least one discontinuous face from the at least one supplementary image,
wherein in the detecting of at least one discontinuous face, at least one discontinuous face is detected from a plurality of faces which configures the updated mesh data.

8. The projection image compensating method according to claim 7, wherein the generating of updated mesh data includes:
converting a coordinate of the mesh data using the position information corresponding to the at least one representative image;
adding an additional vertex in a position where a boundary of the at least one representative image and a plurality of faces which configures the coordinate-converted mesh data intersect; and
generating the updated mesh data by dividing the plurality of faces using the additional vertex.

9. The projection image compensating method according to claim 7, wherein in the generating of updated mesh data, the updated mesh data is generated by sequentially updating the mesh data for the at least one representative image.

10. The projection image compensating method according to claim 7, wherein the detecting of at least one discontinuous face includes:
identifying a pixel value of the representative image corresponding to each of the vertexes which configure each of the plurality of faces which configures the mesh data; and
detecting the at least one discontinuous face with a face having one or more vertexes which does not have a corresponding pixel value in the representative image or a face corresponding to two or more areas including the boundary of a representative image.

11. A projection image compensating apparatus, comprising:
a memory configured to store computer-readable instructions: and
one or more processors configured to execute the computer-readable instructions such that the one or more processors are configured to:
acquire mesh data, at least one representative image, at least one supplementary image, and position information which is information about an obtaining pose of each image for an indoor space;
generate updated mesh data obtained by updating the mesh data based on a result of intersecting the at least one representative image and a plurality of faces which configures the mesh data;
detect at least one discontinuous face which does not have a pixel value corresponding to the at least one representative image in accordance with a predetermined reference, among a plurality of faces which configures the mesh data;
extract pixel information which is information of a pixel value corresponding to the at least one discontinuous face from the at least one supplementary image; and
detect at least one discontinuous face from a plurality of faces which configures the updated mesh data.

12. The projection image compensating apparatus according to claim 11, wherein the one or more processors converts the coordinate of the mesh data using position information corresponding to the at least one representative image, adds an additional vertex in a position where the boundary of the at least one representative image and the plurality of faces which configures the coordinate-converted mesh data, and divides the plurality of faces using the additional vertex to generate the updated mesh data.

13. The projection image compensating apparatus according to claim 11, wherein the one or more processors generates the updated mesh data by sequentially updating the mesh data for the at least one representative image.

14. The projection image compensating apparatus according to claim 11, wherein the one or more processors identifies a pixel value of the representative image corresponding to each of the vertexes which configure each of the plurality of faces which configures the updated mesh data and detects the at least one discontinuous face with a face having one or more vertexes which does not have a corresponding pixel value in the representative image or a face corresponding to two or more areas including the boundary of a representative image.

* * * * *